(12) United States Patent
Kim et al.

(10) Patent No.: US 10,557,509 B2
(45) Date of Patent: Feb. 11, 2020

(54) METHOD OF CONTROLLING VEHICLE DAMPER PULLEY CLUTCH

(71) Applicants: Hyundai Motor Company, Seoul (KR); Kia Motors Corporation, Seoul (KR)

(72) Inventors: Dae Kwang Kim, Whasung-Si (KR); Hyo Seong Wi, Whasung-Si (KR); Keun Sang Kim, Whasung-Si (KR); Jun Seong Kim, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/033,795

(22) Filed: Jul. 12, 2018

(65) Prior Publication Data

US 2019/0195297 A1 Jun. 27, 2019

(30) Foreign Application Priority Data

Dec. 21, 2017 (KR) .................. 10-2017-0177366

(51) Int. Cl.
*F16D 48/06* (2006.01)

(52) U.S. Cl.
CPC .... *F16D 48/06* (2013.01); *F16D 2500/10418* (2013.01); *F16D 2500/3063* (2013.01); *F16D 2500/3109* (2013.01); *F16D 2500/3161* (2013.01); *F16D 2500/70424* (2013.01)

(58) Field of Classification Search
CPC ........... F16D 48/06; F16D 2500/10418; F16D 2500/10437; F16D 2500/306–3069; F16D 2500/3109; F16D 2500/3161; F16D 2500/70424
See application file for complete search history.

(56) References Cited

U.S. PATENT DOCUMENTS 10,220,830 B2 * 3/2019 Colavincenzo ........ B60K 6/387

FOREIGN PATENT DOCUMENTS

KR 10-2010-0034863 A 4/2010

* cited by examiner

*Primary Examiner* — Erin D Bishop
(74) *Attorney, Agent, or Firm* — Morgan, Lewis & Bockius LLP

(57) ABSTRACT

A method of controlling a damper pulley clutch for selectively transmitting power of an engine to engine accessories, may include determining, by a controller, whether a vehicle is driven in a fuel-cut mode under deceleration of the vehicle and controlling the damper pulley clutch, by the controller, to be engaged upon determining that the vehicle is driven in the fuel-cut mode and to be disengaged upon determining that the vehicle is not driven in the fuel-cut mode.

7 Claims, 2 Drawing Sheets

METHOD OF CONTROLLING VEHICLE DAMPER PULLEY CLUTCH

CROSS REFERENCE TO RELATED APPLICATION

The present application claims priority to Korean Patent Application No. 10-2017-0177366, filed Dec. 21, 2017, the entire contents of which is incorporated herein for all purposes by this reference.

BACKGROUND OF THE INVENTION

Field of the Invention

The present invention relates to a method of controlling a vehicle damper pulley clutch, which is capable of minimizing driving force loss of an engine by controlling engine power transmitted to engine accessories according to a driving condition of a vehicle.

Description of Related Art

A damper pulley is engaged to a crank shaft to transmit power received from an engine to a belt. Engine accessories such as a water pump, a generator and an air conditioner (A/C) are driven by the engine power transmitted to the belt.

The water pump needs to operate to circulate cooling water for cooling the engine. However, the water pump operates in proportion to an engine rotation speed even when the engine does not need to be cooled and thus serves as a load of the engine, increasing fuel consumption.

Furthermore, the generator needs to operate to generate electrical energy necessary to drive the engine and the vehicle. However, the generator operates in proportion to an engine rotation speed even when electricity generation is not required and thus serves as a load of the engine, increasing fuel consumption.

Furthermore, the A/C also operates in proportion to an engine rotation speed even when cooling is not required, generating friction loss and increasing fuel consumption.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling a vehicle damper pulley clutch, which is configured for minimizing driving force loss of an engine by controlling engine power transmitted to engine accessories according to a driving condition of a vehicle.

In accordance with an aspect of the present invention, the above and other objects may be accomplished by a method of controlling a damper pulley clutch for selectively transmitting power of an engine to engine accessories including determining, by a controller, whether a vehicle is driven in a fuel-cut mode under deceleration of the vehicle and controlling the damper pulley clutch, by the controller, to be engaged upon determining that the vehicle is driven in the fuel-cut mode and to be disengaged upon determining that the vehicle is not driven in the fuel-cut mode.

The method may further include comparing an internal temperature with a predetermined temperature for the air conditioner when an air conditioner operates and disengaging the damper pulley clutch if the internal temperature is less than the air conditioner set temperature.

When a defrost mode is selected during operation of the air conditioner, the damper pulley clutch may be controlled to be engaged.

The method may further include determining a state of charge (SOC) value of a battery and engaging the damper pulley clutch if the SOC value of the battery is less than a set value.

The method may further include determining a battery voltage and a battery discharge amount and engaging the damper pulley clutch if the battery voltage is less than a set value and the battery discharge amount exceeds a set value.

The method may further include determining whether a circuit necessary to operate the damper pulley clutch has failed and engaging the damper pulley clutch upon determining that the circuit has failed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
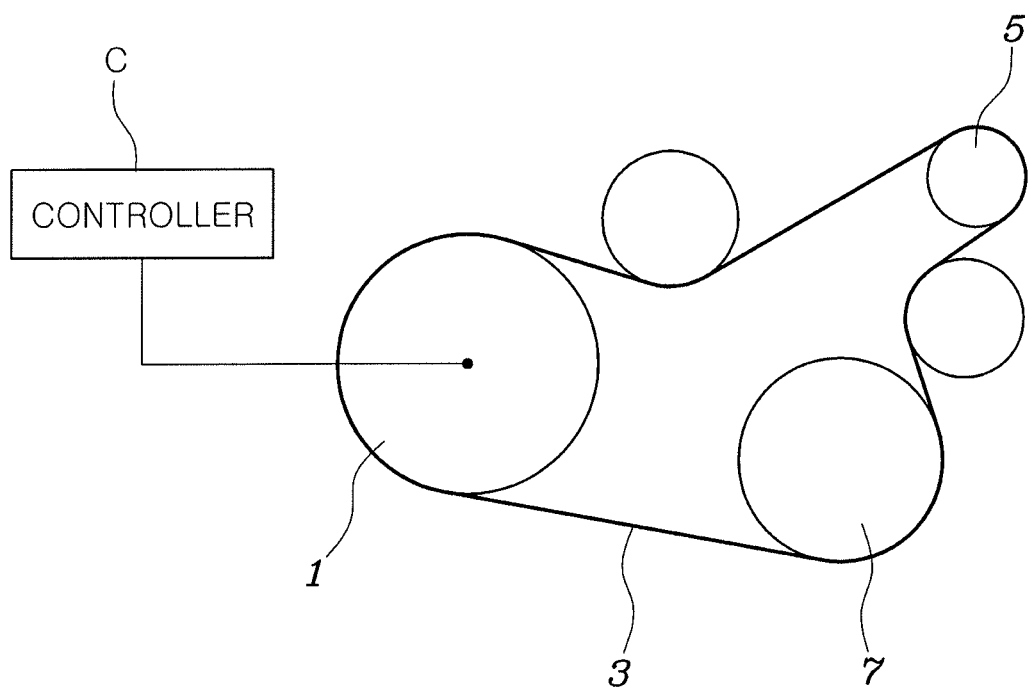
FIG. 1 is a diagram schematically showing a belt connection structure in which engine power is transmitted to a generator and an air conditioner through a damper pulley clutch of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings.

The configuration and function of the damper pulley clutch 1 of the present invention will be described with reference to FIG. 1. First, the damper pulley clutch 1 is directly connected to a crank shaft of an engine to receive power of the engine and is configured to control the power of the engine according to engaging or disengaging operation. Operation of the damper pulley clutch 1 may be controlled by a controller C which may be an electronic control unit (ECU).

The damper pulley clutch 1 is connected through a belt 3 to transmit power to the generator 5 and an air conditioner (A/C) 7. As a water pump, an electric water pump using a motor may be used. In the instant case, the electric water pump may be controlled by the ECU according to thermal load.

The damper pulley clutch 1 is controlled to be disengaged (opened) to stop the water pump upon vehicle startup, a situation in which the engine is at a low temperature, and an acceleration or constant-speed situation, such that the power of the engine is used to drive the vehicle without being transmitted to accessories, improving fuel efficiency and power performance.

However, when the engine is at a high temperature, the water pump may operate to cool the engine.

Figure 2:
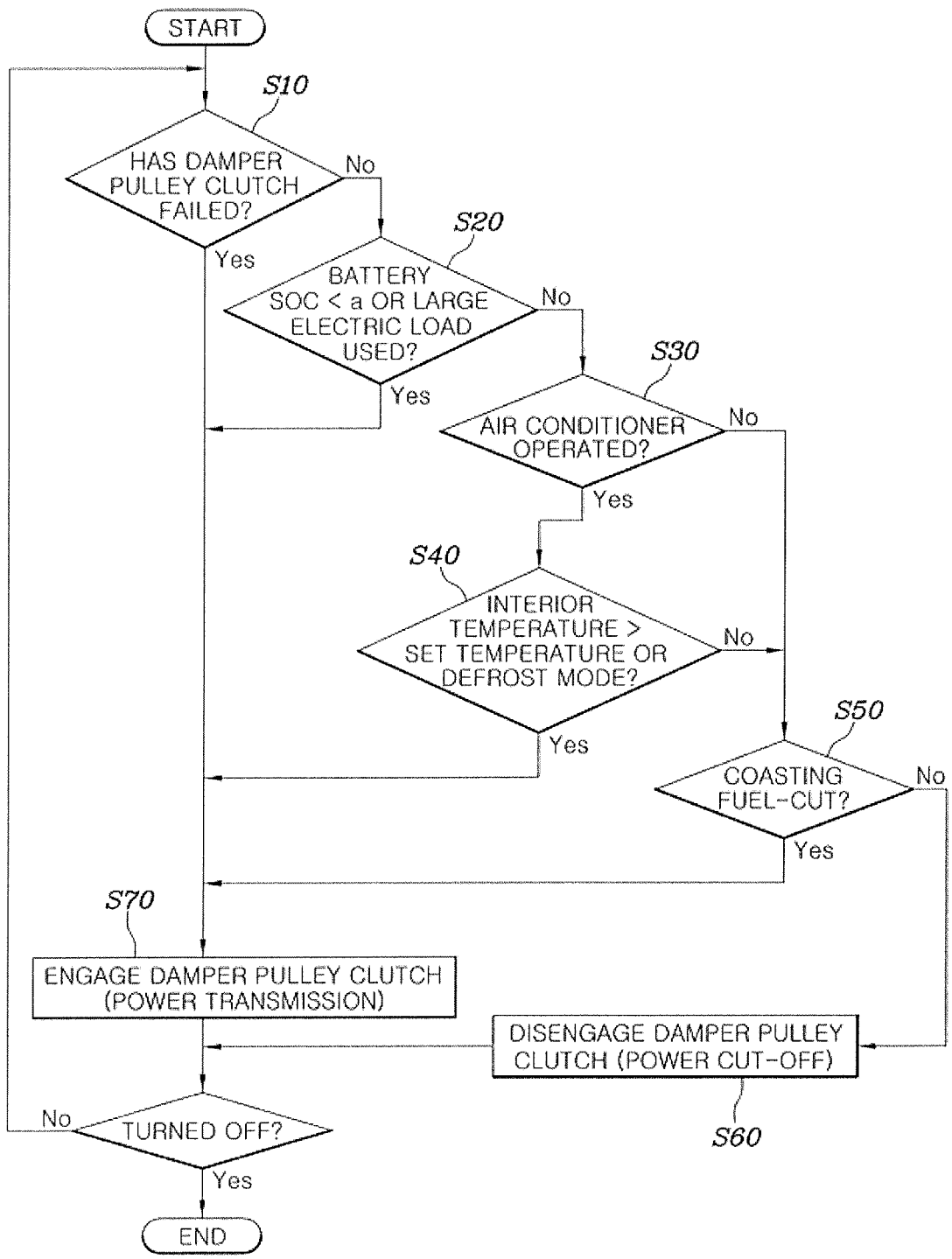
FIG. 2 is a flowchart illustrating a process of controlling a damper pulley clutch according to an exemplary embodiment of the present invention.

The method of controlling the damper pulley clutch 1 of the present invention will be described with reference to FIG. 2. A determination as to whether the vehicle is driven in a fuel-cut mode under deceleration is made through the controller C.

The controller C controls the damper pulley clutch 1 to be engaged upon determining that the vehicle is driven in the fuel-cut mode and controls the damper pulley clutch 1 to be disengaged upon determining that the vehicle is not driven in the fuel-cut mode.

That is, the inertial energy of the vehicle is consumed in a fuel-cut driving period under deceleration of the vehicle. In the instant case, the damper pulley clutch 1 is engaged to perform regeneration (generator operation) of the generator 5 by the inertial energy of the vehicle, generating electricity.

In contrast, if the vehicle is not driven in the fuel-cut mode, the damper pulley clutch 1 is disengaged so as not to transmit engine power to the accessories, reducing engine driving force loss and reducing fuel consumption.

Furthermore, in an exemplary embodiment of the present invention, when a driver operates the air conditioner 7, an internal temperature of the vehicle and a predetermined temperature for the air conditioner may be compared.

If the internal temperature is less than the predetermined temperature for the air conditioner as the result of comparison, the damper pulley clutch 1 may be controlled to be disengaged. If the internal temperature exceeds the air conditioner set temperature, the damper pulley clutch 1 may be controlled to be engaged.

That is, when the air conditioner 7 operates, engine power is controlled not to be transmitted to a compressor for operating the air conditioner 7 when the internal temperature does not require cooling, reducing engine driving force loss and reducing fuel consumption.

In contrast, when the internal temperature requires cooling, engine power is controlled to be transmitted to the compressor, cooling the internal to the vehicle.

In an exemplary embodiment of the present invention, when the driver selects a defrost mode during operation of the air conditioner 7, the damper pulley clutch 1 may be controlled to be engaged.

That is, if the air conditioner 7 operates to defrost the windshield of the vehicle, the air conditioner may be controlled to operate regardless of the internal temperature, for safety's sake.

In an exemplary embodiment of the present invention, a state of charge (SOC) value of a battery may be determined.

Upon determining that the SOC value of the battery is less than a set value, the damper pulley clutch 1 may be controlled to be engaged. If the SOC value of the battery is equal to or greater than the set value, the damper pulley clutch 1 may be controlled to be disengaged.

That is, if the remaining amount of the battery is insufficient, the damper pulley clutch 1 may be controlled to be engaged such that the remaining amount of the battery may be maintained over a predetermined level through electricity generation of the generator 5.

Furthermore, in an exemplary embodiment of the present invention, a battery voltage and a battery discharge amount may be determined.

Upon determining that the battery voltage is less than a set value and the battery discharge amount exceeds a set value, the damper pulley clutch 1 may be controlled to be engaged. The battery discharge amount is used to determine whether battery discharge current is over discharged to determine whether the damper pulley clutch is engaged or not. If the condition of the battery voltage or the battery discharge amount is not satisfied, the damper pulley clutch 1 may be controlled to be disengaged.

That is, although the remaining amount of the battery is sufficient, when an electric load is significantly increased, the battery voltage is dropped and the battery discharge current is increased. In the instant case, the remaining amount of the battery may be controlled to be maintained over a predetermined level through electricity generation of the generator 5.

Furthermore, in an exemplary embodiment of the present invention, it is possible to determine whether a circuit necessary for operation of the damper pulley clutch 1 has failed.

Upon determining that the circuit has failed, the damper pulley clutch 1 may be controlled to be engaged.

For example, if an electric circuit for controlling the damper pulley clutch 1 is disconnected or short-circuited or a communication circuit is disconnected or short-circuited, reliability of engaging or disengaging the damper pulley clutch 1 is lowered and thus the damper pulley clutch 1 may be controlled to be maintained in the engaged state.

The control flow of the damper pulley clutch 1 will be sequentially described with reference to FIG. 2.

While the vehicle travels, whether the circuit for controlling the damper pulley clutch 1 has failed is determined (S10).

Upon determining that the circuit has failed in S10, the damper pulley clutch 1 is controlled to be engaged and maintained in the engaged state (S70).

In contrast, upon determining that the circuit is normal in S10, whether the SOC value of the battery is equal to or greater than a or whether a large electric load greater than a predetermined load is required by the battery voltage and the battery discharge amount is determined (S20).

Upon determining that the SOC value of the battery is less than a or the large electric load is required in S20, the damper pulley clutch 1 is controlled to be engaged and maintained in the engaged state (S70).

In contrast, in a normal state, that is, upon determining that the SOC value of the battery is equal to or greater than a or whether a large electric load is not required by the battery voltage and the battery discharge amount in S20, whether the air conditioner 7 operates is determined (S30).

If the air conditioner 7 operates, whether an internal temperature is greater than a predetermined temperature or a defrost mode is currently selected is determined (S40).

Upon determining that the internal temperature is greater than the predetermined temperature or the defrost mode is currently selected in S40, the damper pulley clutch 1 is controlled to be engaged and maintained in the engaged state (S70).

In contrast, upon determining that the internal temperature is less than the predetermined temperature or the defrost mode is not currently selected, whether the vehicle is currently driven in a fuel-cut mode under deceleration is determined (S50).

Upon determining that the vehicle is currently driven in the fuel-cut mode in S50, the damper pulley clutch 1 is controlled to be engaged and maintained in the engaged state (S70).

In contrast, upon determining that the vehicle is not currently driven in the fuel-cut mode, the damper pulley clutch 1 is controlled to be disengaged such that the driving force of the engine is used to drive the vehicle, reducing driving force loss of the engine (S60).

As described above, in an exemplary embodiment of the present invention, the damper pulley clutch 1 is controlled to be turned on/off according to the driving condition of the vehicle to selectively transmit the driving force of the engine to the accessories, reducing an inertial load connected to the crank shaft, minimizing energy loss upon acceleration/deceleration or coasting, improving fuel efficiency, and improving power performance under acceleration.

Furthermore, regenerative electricity generation is caused through control of the damper pulley clutch 1 according to the driving condition of the vehicle, minimizing energy loss.

According to an exemplary embodiment of the present invention, the damper pulley clutch is controlled to be turned on/off according to the driving condition of the vehicle to selectively transmit the driving force of the engine to the accessories, reducing an inertial load connected to the crank shaft, minimizing energy loss upon acceleration/deceleration or coasting, improving fuel efficiency, and improving power performance under acceleration. Further. Furthermore, regenerative electricity generation is caused through control of the damper pulley clutch according to the driving condition of the vehicle, minimizing energy loss.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a damper pulley clutch for selectively transmitting power of an engine to engine accessories, the method comprising:
    determining, by a controller, whether a vehicle is driven in a fuel-cut mode under deceleration of the vehicle;
    controlling the damper pulley clutch, by the controller, to be engaged upon determining that the vehicle is driven in the fuel-cut mode and to be disengaged upon determining that the vehicle is not driven in the fuel-cut mode;
    determining whether a circuit to operate the damper pulley clutch has failed; and
    engaging the damper pulley clutch upon determining that the circuit has failed.

2. The method according to claim 1, further including:
    determining a state of charge (SOC) value of a battery; and
    engaging the damper pulley clutch when the SOC value of the battery is less than a set value or an electric load is greater than a predetermined load.

3. The method according to claim 2, further including:
    comparing an internal temperature of the vehicle with a predetermined temperature of an air conditioner when the air conditioner operates.

4. The method according to claim 3, further including:
    engaging the damper pulley clutch when either the internal temperature is greater than the predetermined temperature of the air-conditioner or a defrost mode is selected.

5. The method according to claim 3, further including:
    engaging the damper pulley clutch when the internal temperature is less than the predetermined temperature or the defrost mode is not selected, and when the vehicle is driven in the fuel-cut mode.

6. The method according to claim 3, further including:
    disengaging the damper pulley clutch when the internal temperature is less than the predetermined temperature or the defrost mode is not selected, and when the vehicle is not driven in the fuel-cut mode.

7. The method according to claim 1, further including:
    determining a battery voltage and a battery discharge amount; and
    engaging the damper pulley clutch when the battery voltage is less than a set value and the battery discharge amount exceeds a set value.

* * * * *